United States Patent [19]

Grosseau

[11] 3,837,712

[45] Sept. 24, 1974

[54] ANTI-LOCKING BRAKING DEVICE

[75] Inventor: Albert Grosseau, Chaville, France

[73] Assignee: Societe Anonyme Automobiles Citroen, (Seine) Paris, France

[22] Filed: July 19, 1973

[21] Appl. No.: 380,852

[30] Foreign Application Priority Data
July 31, 1972   France ............................ 72.27601

[52] U.S. Cl. .................................. 303/21 F, 303/68
[51] Int. Cl. ............................................... B60t 8/12
[58] Field of Search ...................... 303/21 F, 61–63, 303/68–69; 188/181 A

[56] References Cited
UNITED STATES PATENTS
| | | | |
|---|---|---|---|
| 3,532,391 | 10/1970 | Klein .................................. | 303/21 F |
| 3,550,966 | 12/1970 | Leiber ............................ | 188/181 A |
| 3,767,271 | 10/1973 | Grosseau .......................... | 303/21 F |

*Primary Examiner*—Trygve M. Blix
*Assistant Examiner*—Jesus D. Sotelo
*Attorney, Agent, or Firm*—Marn & Jangarathis

[57] ABSTRACT

An anti-locking braking device for a wheel of a motor vehicle for reducing jerky braking, wherein a fluid operated brake cylinder is connectable, when the wheel is about to lock, to a fluid outlet comprising first and second flow paths leading to a reservoir. In the first flow path a restriction is provided downstream of a first chamber whose volume is increased by movement therein of a spring biased first piston under the effect of pressure of the fluid admitted to the chamber. Such movement is arranged to open a first valve in the second flow path, and fluid form the brake cylinder to the reservoir can by-pass the restriction and thus a faster rate of pressure drop in the brake cylinder can be achieved, provided a second valve, also in the second flow path is open. Movement of this second piston controls opening and closing of the second flow path by the second valve which is open when fluid pressure in the first flow path upstream of the restriction exerts a lower force on one side of the second piston than the force exerted on the other side by a spring.

3 Claims, 3 Drawing Figures

ANTI-LOCKING BRAKING DEVICE

An anti-locking braking device is known facilitating rapid unlocking of the wheel owing to a sudden but limited drop in pressure authorised by the braking members, followed by a progressive drop until the wheel has been re-started sufficiently for once more applying braking pressure. This device eliminates the jerky movements normally encountered at the time of successive venting necessary for effective unlocking in devices of the type comprising an all or nothing discharge valve.

With the intention of retaining the aforesaid advantages, the present invention proposes to add constructional arrangements to the same type of anti-locking device in order that it is better adapted to conditions of use, in particular to variations of the coefficient of adhesion of the vehicle to the ground.

To this end, the invention relates to an anti-locking braking device for a wheel of a motor vehicle, comprising a source of fluid under pressure controlled by the driver, receiving means coupled to the brake of said wheel, a valve controlled by a control device detecting the dynamic state of the wheel and able to connect the receiving members selectively to the source of fluid under pressure and to a first conduit connected to a fluid reservoir, a flow-limiter being arranged in said first conduit and an elastically variable member provided in particular with a moving part being interposed in said first conduit, between the controlled valve and said flow-limiter.

According to the invention, a second conduit branched from said first conduit between the controlled valve and the flow-limiter and connected to the said fluid reservoir, comprises closure means coupled to the moving part of the elastically variable member which is in its position opening said second conduit when the volume of the elastically variable member is at a maximum and, moreover, comprises a valve member which is controlled by the pressure prevailing in the part of the first conduit between the controlled valve and the flow-limiter, which is indicative of the pressure prevailing in the braking receiving members and which is in its position closing said second conduit when the control pressure is greater than a pre-determined value.

In one embodiment of a device according to the invention, the first and second conduits are joined by means of the elastically variable member and said closure means is constituted by the moving part of the elastically variable member in the form of a piston mounted to slide in a cylindrical and hollow rigid body to which the second conduit is connected, said piston being provided with inner channels which, when the volume of the elastically variable member is at a maximum, are able to connect said second conduit to a chamber defined by said piston and said body and connected to the first conduit between the controlled valve and the flow-limiter.

In this embodiment, said valve member is constituted by a cylindrical hollow body in which a slidably mounted closure piston defines a first chamber connected to the said chamber of the elastically variable member and a second chamber connected to said reservoir, to which the second conduit is connected. Elastic means are coupled between said piston and said body and tend to keep the piston in its position opening the second conduit keeping the volume of the first chamber at a minimum such that the piston uncovers the aperture connecting the second conduit to the second chamber.

The invention will be better understood from the description given hereafter as a purely indicative and non-limiting example which will reveal the advantages and secondary features.

Reference is made to the accompanying drawings in which.

Figure 1:
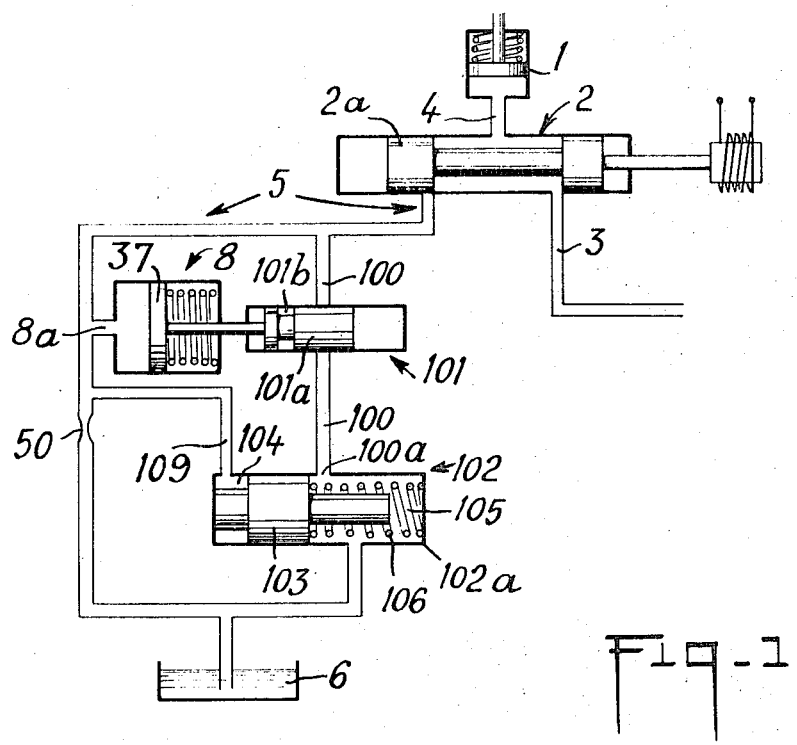
FIG. 1 is a circuit diagram of a device according to the invention.

Referring firstly to FIG. 1, there may be seen a valve 2 controlled by a detector of the dynamic state of the wheel connected to a source of fluid under pressure (not shown) by the conduit 3 to the braking receiving members coupled to the wheel, represented by the brake cylinder 1, by the conduit 4 and to a fluid reservoir 6 by a first venting conduit 5.

According to the position of the slide 2a of the controlled valve, a connection is made either between the conduits 3 and 4 or between the conduits 4 and 5, in this case, the conduit 3 preferably being closed.

This same figure also shows that a flow-limiter 50 is disposed in the conduit 5 between the controlled valve 2 and the fluid reservoir 6. An elastically variable member 8 is connected to the conduit 5 by a conduit 8a between the controlled valve 2 and the limiter 50.

According to the invention, a second venting conduit 100 is also connected to the conduit 5 between the controlled valve 2 and the flow-limiter 50 and is connected to the fluid reservoir 6 to which it returns. Means for closing the conduit 100 are represented by a valve 101 whose slide 101a is connected to a moving part 37, for example, a piston or elastic membrane disposed in the elastically variable member 8, which slide 101a acts in the direction for opening the conduit 100 when the volume of the elastically variable member 8 is at a maximum, an opening which is produced by the fact that the conduit 100 aligns with a groove 101b in the slide 101a.

A valve member 102 is disposed in the conduit 100 and is formed by a piston 103 slidably mounted in a cylindrical body 102a with which it defines a first chamber 104 connected to the conduit 5 between the controlled valve and the flow-limiter 50 by a conduit 109 and a second chamber 105 connected to the reservoir 6 to which the second conduit 100 is connected. A calibrated spring 106 is coupled between the piston 103 and the body 102a and tends to keep the piston 103 in its position for opening the conduit 100, thus keeping the volume of the chamber 104 minimal such that the piston uncovers the aperture 100a connecting the second conduit 100 to the chamber 106.

Figure 2:
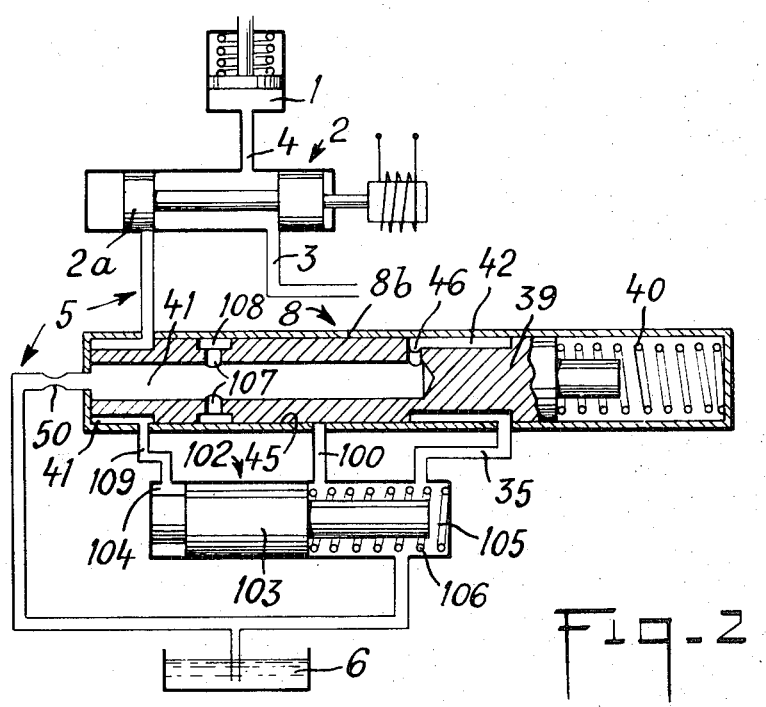
FIG. 2 is a diagram of an embodiment of the invention.

FIG. 2 shows one embodiment of the circuit diagram described with reference to FIG. 1 in which certain parts of FIG. 1 are again shown with the same reference numerals.

This Figure shows an elastically variable member 8 which is constituted by a rigid and hollow cylindrical body 8b and a moving part, in this case a piston 39 slidably mounted in the body 8b and subject to the action of a spring 40 whose action is simply to keep the volume of the member 8 minimal. The piston 39 thus defines two chambers in the member 8, a first chamber 41 connected to the conduit 5 and a second chamber 42 connected to an auxiliary conduit 35 which establishes a connection between said chamber 42 and the reservoir 6. An aperture 46 provided in the piston connects said two chambers 41 and 42. The aperture 46 is calibrated and thus constitutes an auxiliary flow-limiter. This configuration of the elastically variable member facilitates rapid emptying through the flow-limiter 46 and conduit 35.

According to the invention, the piston 39 comprises inner channels, in this case apertures 107 connecting a groove 108 to the chamber 41 which is able to be connected to the conduit 100 branched from the body 8b of the member 8 when the volume of the chamber 41 is maximum. The means for closing the conduit 100 is thus the bearing surface of the piston having the reference numeral 45 in the drawing.

In this embodiment, the chamber 41 of the elastic member is connected to the chamber 104 of the valve member 102 by a conduit 109.

Figure 3:
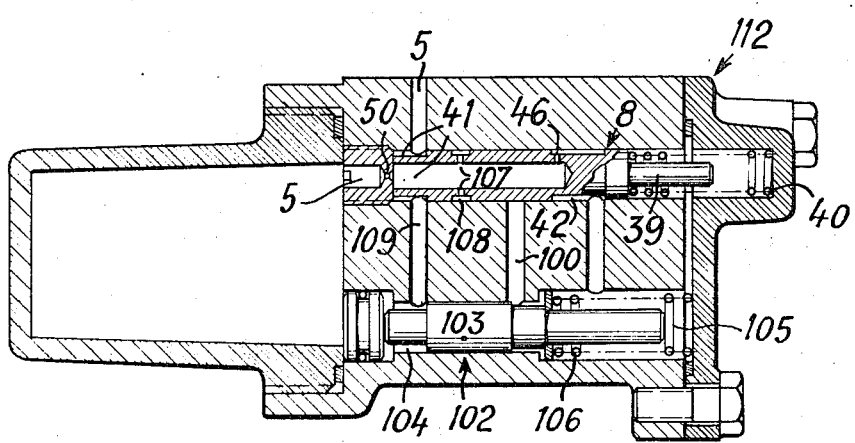
FIG. 3 is a sectional view of an industrial construction corresponding to the diagram of FIG. 2.

Finally, FIG. 3 illustrates an industrial embodiment seen in section, of the member 8 and the valve member 102 re-grouped in the same unit 112. In this figure, return conduits of the fluid reservoir are not shown.

A device of this type operates as follows. In known manner, the device for controlling the valve 2 detects that locking of the wheel is imminent and the slide 2a of the valve is brought into its position for venting the braking members 1. The fluid under pressure may thus flow from the braking members 1 towards the reservoir 6 through the conduit 5. The presence of the flow-limiter 50 forces the fluid to fill the elastic member 8.

According to the invention, when the member 8 has reached its maximum volume, the groove 101b of the slide 101a, of the closure means 101 is connected to the second conduit 100 (FIG. 1), or the groove 108 is connected to the conduit 100 (FIGS. 2 and 3).

The venting of fluid from the braking members 1 through the conduit 100 thus depends solely on the state of the valve member 102. If the pressure exerted by the control fluid on the piston 103 is greater than the calibration of the spring 106, the piston 103 is displaced against the action of this spring 106 and closes the mouth 100a of the conduit 100 in the chamber 105. It is thus impossible for fluid to pass through the conduit 100 and the braking members 1 are vented through the conduit 5 by means of the flow-limiter 50.

On the other hand, if the pressure exerted by the control fluid on the piston 103 is less than the calibration of the spring 106, the piston 103 is retained in its position opening the conduit 100, the mouth 100a of this conduit in the chamber 105 being kept uncovered by the piston. In this case, it is thus possible for fluid to pass through the conduit 100 towards the reservoir 6, this conduit having a pressure drop much less than that of the conduit 5.

In FIGS. 2 and 3, the control fluid is leaving the chamber 41 of the elastically variable member 8. When the braking members are vented, there is a venting counter-pressure substantially equal to the braking pressure which is established inside the conduit 5 and the chamber 41. The latter is also established in the chamber 104 of the valve member 102 by means of the conduit 109 and its value determines the state of the valve member at the time when the conduit 100 is connected to the chamber 41.

If the counter-pressure is greater than the calibration of the spring 106, this signifies that the locking of the wheel has taken place under good conditions of adhesion. The wheel will thus be re-started quickly after the venting of the braking members according to the operation of the main patent. Nevertheless, if it has not been sufficiently re-started when the pressure in the braking members is equal to the calibration of the spring 106, the opening at this instant of the circuit 100 by the member 102 will thus create a final sudden drop in pressure which will allow rapid re-starting of the wheel.

In the case of counter-pressure less than the value of the calibration of the spring, the locking of the wheel has taken place under conditions of poor adhesion and it is necessary to effect a sudden drop in pressure of the fluid in the braking members to give maximum assistance to re-starting the wheel slowed down by poor adhesion.

In the embodiments illustrated in FIGS. 2 and 3, it is naturally necessary to calibrate the passages for the fluid correctly to obtain good operation. In Particular, the pressure drop of the flow-limiter 50 is appreciably greater than that of the flow-limiter 46 in order to facilitate rapid emptying of the elastically variable member 8. The apertures 107 and the groove 108 must in turn have a minimum pressure drop in order that the pressure drop of the fluid, when the second conduit 100 is open, is as great as possible.

The invention thus proposes a device of simple design which advantageously makes it possible to modulate the pressure in the braking members when locking occurs, depending on the quality of adhesion of the ground encountered locally. This constructional arrangement allows re-starting of the wheel on the point of locking under optimum conditions of speed and, in particular, in the case of poor adhesion, such as, for example, on frost, on wet roads or gravel by eliminating the flow-limiter 50 from the venting circuit of the braking fluid in order to cause a sudden drop in pressure.

The invention has an interesting application in the field of the motor industry.

It is not limited to the embodiment which has been described but, on the contrary, covers all variations which could be applied thereto without diverging from its framework or spirit.

What is claimed is:

1. Anti-locking braking device for a wheel of a motor vehicle, comprising a source of fluid under pressure controlled by the driver, receiving means coupled to the brake of said wheel, a valve controlled by a control device detecting the dynamic state of the wheel and able to connect the receiving means selectively to the source of fluid under pressure and to a first conduit means connected to a fluid reservoir, a flow-limiter being disposed in said first conduit means and an elastically variable member, provided, in particular, with a moving part, being interposed in said first conduit means between the controlled valve and said flow-limiter, characterised by a second conduit means branched from the first conduit means between the controlled valve and the flow-limiter and connected to said fluid reservoir, said second conduits means includes closure means coupled to the moving part of the elastically variable member which is in a position for opening said second conduit means when the volume of fluid in the elastically variable member is at a maximum and wherein said second conduit means comprises a valve member controlled by the pressure prevailing in said first conduit means between the controlled valve and the flow-limiter which is indicative of the pressure prevailing in the braking receiving members and which is in a position for closing said second conduit means when the control pressure is greater than a pre-determined value.

2. Braking device according to claim 1, characterised in that the first and second conduits means are joined by means of the elastically variable member, wherein the said closure means is constituted by the moving part of the elastically variable member formed as a piston mounted to slide in a cylindrical and hollow rigid body to which the second conduit means is connected, said piston being provided with inner channels which, when the volume of fluid in the elastically variable member is at a maximum, are able to connect said second conduit means to a chamber defined by said piston in said body with the first conduit means at a point between the controlled valve and the flow-limiter.

3. Braking device according to claim 1, characterised in that said valve member is constituted by a cylindrical hollow body in which a slidably mounted closure piston defines a first chamber connected to the chamber of the elastically variable member, and a second chamber connected to said reservoir to which the second conduit means is connected and wherein an elastic member is provided between said piston and said body and tends to maintain the piston in a position opening the second conduit means by keeping the volume of fluid in the first chamber minimal such that the piston uncovers an aperture connecting the second conduit means to the second chamber.

* * * * *